United States Patent [19]

Erwin et al.

[11] Patent Number: 4,805,946
[45] Date of Patent: Feb. 21, 1989

[54] POSTAGE METER SECURITY SEAL

[75] Inventors: Timothy R. Erwin, Redding; Jeffrey J. Prior, Monroe, both of Conn.

[73] Assignee: Pitney Bowes Inc., Stamford, Conn.

[21] Appl. No.: 48,967

[22] Filed: May 1, 1987

Related U.S. Application Data

[63] Continuation of Ser. No. 718,585, Apr. 1, 1985, abandoned.

[51] Int. Cl.⁴ ............................................. E05C 5/04
[52] U.S. Cl. .................................................... 292/251
[58] Field of Search ........................... 292/251, 307 R; 211/910

[56] References Cited

U.S. PATENT DOCUMENTS

| | | | |
|---|---|---|---|
| 1,805,937 | 5/1931 | Berge | 411/372 |
| 3,174,383 | 3/1965 | Heil | 411/910 X |
| 3,298,272 | 1/1967 | Henderson | 411/910 X |
| 4,478,443 | 10/1984 | Erwin | 411/910 X |

FOREIGN PATENT DOCUMENTS 2095356  9/1982  United Kingdom ............... 411/910

Primary Examiner—Richard E. Moore
Attorney, Agent, or Firm—Michael J. DeSha; David E. Pitchenik; Melvin J. Scolnick

[57] ABSTRACT

Apparatus for sealing a postage meter is disclosed. The sealing apparatus includes a member with a cut-out portion. The cut-out portion includes two cover tab receiving openings which are positioned diametrically across from each other. The center of the cut-out portion has a bore hole that runs completely through the thickness of the cover. An insert is provided with is adapted to fit into and mate with the bore hole. The insert contains an opening which will accept a screw and also contains upwardly extending tabs. A screw is used to fasten the sealing apparatus to the postage meter.

A cover is stacked over the upwardly extending tab of the insert. The cover is welded to the upwardly extending tabs thereby making it impossible to remove the screw without first drilling a hole in cover and thereafter prying the cover off to expose the screw. A broken or fraudulent cover will indicate that the meter has been tampered with.

17 Claims, 3 Drawing Sheets

POSTAGE METER SECURITY SEAL

This application is a continuation-in-part, of application Ser. No. 718,585, filed Apr. 1, 1985, now abandoned.

FIELD OF THE INVENTION

This invention relates to a specific security sealing device that is particularly adapted for use in the housings of valuables. More specifically, the present invention relates to a tamper-proof sealing means for postage meters and the like.

BACKGROUND OF THE INVENTION

There are known many types of tamper-proof sealing means used in containers housing valuables or in structures where security is important. In one type of security means, the lock comprises two members adapted for automatic interlocking engagement on the introduction of one member into a cavity of the other member. The first member generally is a rod shaped body with a tapered insertion end and with an abruptly restricted cross-sectional area slightly rearward of the tapered section to form a shoulder. Single engagement locks of this type are disclosed in U.S. Pat. Nos. 3,730,578 and 1,553,188.

In the single lock ring engagement disclosed in U.S. Pat. No. 3,730,578 the second member is a block with throughgoing openings, the diameter of which is smaller at the end where the rod shaped body is introduced than at the opposite end. This opposite end is closed by an inserted sleeve provided with a bore facing the interior of the block and of the same diameter as the smallest diameter of the throughgoing openings. Such a single lock is used partly as a padlock but specifically as a seal, for instance, on containers for transport of goods. The opening of the lock requires the use of force and the fact that the lock is intact should indicate that no unauthorized person has had access to the interior of the container.

However, it was found that a lock of this type could be opened and relocked without leaving any direct signs of the use of force and thus the security in this type system would be lost. Furthermore, the interlocking of the two members was not very secure because the lock could be opened by impact or by means of a crowbar. In the single engagement lock disclosed in U.S. Pat. No. 1,553,188 the aforesaid lock ring is replaced by a tubular sleeve open at both ends. Theoretically, this results in an improved interlocking connection between the two members of the lock; this lock can also be broken by a relatively simple operation since the block member consists of porcelain or plastic material.

There are also disclosed in the prior art various other fasteners or security devices wherein the locking connector is of the type which has two similar elements that are interlocked together. It may be desirable in this type of security system that the connector not be releasable because of the desired permanency of the connection being made. A connector that cannot be released except by obvious destruction would provide such a seal. The use of such destructible seals can be effective in reducing tampering or the theft of the contents of a container. Such a connector would probably not, however, provide ultimate security for the reason that it is preferably made of plastic-like material that could be relatively easily cut and replaced. This type of security device is disclosed in U.S. Pat. No. 3,897,162.

Previous construction of security seals or other types of devices in many instances consists of expensive components that are also difficult to use. Some of these seals or devices require expensive tools in order that they can be appropriately installed or closed; these devices also do not totally eliminate the possibility of undesired tampering or manipulation. Another known construction involves the use of a metal strip drawn through the opening or openings of an article which is to be sealed. After the sheet metal strip is flexed over upon itself, it can be riveted at both of its ends by tongs or pliers. The rivet location is subsequently covered with a plastic cap. With this construction seal, there is the drawback that riveting of the metal strip is not undertaken in a completely faultless manner.

Tampering or manipulation for the purposes of providing a false seal or giving the appearance that the article has in fact been sealed is possible. Also known is a system which involves a seal whereby both ends of a flexible strip are associated with rather bulky closure elements. Thus, this construction of seal cannot be employed in those instances in which the opening or openings of the article to be sealed is small, especially in conjunction with openings for the use of convenient closing devices such as screws and the like. Also these devices are generally difficult to install or expensive for volume use. While these seals do provide assurance that unauthorized openings have not occurred, such seals can generally be circumvented. This is done by anyone having access to a supply of seals by simply replacing a broken seal with a new one.

Counterfeiting seals also would not be difficult for someone willing to go through the considerable time and expense involved. These prior art devices which utilize a frangible or destructible device have been described in various patents, for example Dutch patent application 7,412,131 or U.S. Pat. Nos. 2,142,048; 3,983,645 and 3,924,800. Devices like these are used for dispatching documents in transportation bags. One such device takes the form of a flat envelope having along one of the edges a zip fastener which in closed position is sealed by means of a rupturable or frangible sealing member.

In order to be able to establish afterwards that the transportation bag has been opened by a person authorized to do so, one must be able to ascertain if the seal is original or a replacement. With such a sealing device, it would be possible to reapply the sealing member quickly and without the use of aids, thus giving the impression that the sealing member was never broken. In the Dutch patent above noted, the elastic means which are to be deformed are formed by resilient lips projecting from the shaft portion of the sealing member. In the head of the sealing member, there is formed a slit wherein a special tool can be engaged for twisting said sealing member in order to break it. It is obvious, however, that in addition to being complex, a design such as this leads to a relatively high cost for the manufacture of this sealing member, especially upon volume and continued use.

U.S. patent application Ser. No. 4,478,443 discloses a postage meter security seal. In this apparatus, the sealing apparatus includes a cover with a cut-out portion. The cover includes two cover tab receiving openings which are positioned diametrically across from each other. The center of the cut-out portion has a bore hold that runs completely through the thickness of the cover. An insert is provided which is adapted to fit into and mate with the bore hole. The insert contains an opening which will accept a screw and also contains upwardly extending tabs. A screw is used to fasten the sealing apparatus to the postage meter. When the tabs are stacked over the screw, it is impossible to remove the screw without first breaking off the tabs. A broken tab will thus indicate that the meter has been tampered with.

This security seal device does work in an exemplary fashion for its intended purpose, but there are some problems in its use. The security seal of this invention can be difficult to manufacture in that the tab receiving portions must be welded over utilizing a special tool to produce the desired result. Often times an unskilled operator will have a difficult time performing the operation of welding the tab portions over the screw. In addition, the tooling to perform the welding operation is relatively complex and therefore relatively expensive in that it must fit into the bore hole in a certain pattern to affect the welding operation of the tabs. It is also well know that the expensive tooling will wear after repeated use and, therefore, have to be replaced. Accordingly, the postage meter security seal disclosed in the above-mentioned patent does have some disadvantages that can cause some problems in high volume manufacturing applications.

There is thus a need to provide a simple and relatively inexpensive sealing device of the type that will be described herein in which no complex or expensive tools are required to manufacture the sealing member.

SUMMARY OF THE INVENTION

It is therefore a principal object of this invention to provide a device to detect unauthorized entry into the interior of a postage meter.

An additional object of this invention is to provide a security sealing means for postage meters that will discourage attempts at the pilfering and tampering of the interior portions of postage meters.

Still another object of this invention is to provide a tamper indicating sealing device which may be attached in addition to postage meters to any container housing any type of valuable object. Another further object of this invention is to provide an efficient postage meter locking means that may be economically manufactured according to various strict government specifications.

A still further object is to provide a postage meter security means whereby a readily visible seal is provided and whose destruction is very easily determined.

Still another further object of this invention is to provide a simple sealing element for postage meters that is clearly exposed, and can be inexpensively manufactured.

And yet a further object of this invention is to provide a security sealing means that is easily replaced or installed when properly destroyed by authorized personnel.

Another further object of this invention is to provide a sealing means for postage meters which fully satisfies the security requirements of the United States and Canada.

The foregoing objects and others are accomplished in accordance with this invention by providing a novel postage meter sealing means comprising a member having therein an aperture or cut out portion having a circular configuration. This cut out portion is provided with two cover tab receiving openings positioned diametrically across from each other. The center of the cut out portion has a cover bore hole or seal receiving element that runs completely through the thickness of said cover.

A second element or security seal insert is adapted to snugly fit into and mate with the bore hole portion. In the center of said insert is a screw bore or tunnel that will align with the screw receptable portion. A screw can be easily inserted into the screw bore and will extend through to connect the security seal insert to the cut-out portion member. Extending above and outwardly from the top of the security seal insert are two tabs that will fit snugly into the covered tab openings. Once the screw has been inserted through the security seal insert, and connected to the first cover via mating with the cover cut out, the screw can be tightened into the meter frame and thereby fix the cover into position.

A cover member is thereafter placed over and in abutment with the tabs. The cover member is also located in a position that will be flush with an outside portion of the postage meter. The cover member is then welded to the tabs, thereby sealing the cover member to the tabs. This sealing action prevents access to and removal of the screw.

Once the cover member has been secured to the tabs, the interior of the postage meter cannot be entered without first breaking the cover member so that the screw can be loosened by any tool or screwdriver. When the cover member is broken to remove the screw to gain access to the interior of the meter for servicing new security seal insert, new inserts can be installed in the postage meter cover.

In this embodiment it is thus impossible to remove the screw without first breaking off the cover member in order to gain operational access to the screw. Thus, a broken or fraudulent cover member will indicate that the meter has been tampered with.

The security seal device of this invention is economically manufactured and is particularly advantageous for large volume usage. The screw used with the device of this invention can be any conventional type of screw; however, it is preferred that a break-off screw be used which gives the security system of this invention a higher degree of security. A break-off screw is the type of screw whereby the top snaps off after the screw is tightened and an additional twisting action is exerted on it. There are many conventional and known break-off screws that are available, any suitable form of this screw may be used.

The security element of this invention is preferred to be positioned in the bottom panel or portion of the postage meter; however, it may be located on any part of the meter cover or skirt that is convenient.

It is also preferred that four separate and individual devices of the present invention be used in each panel corner; however, any number of devices, even only one security seal element, can be used. The cover member of the security device of this invention can be broken off by drilling a hole in the cover member and thereafter prying the member off the postage meter with a screwdriver or any other suitable tool. Also, the cover member could have distinguishing markings on its inside and outside surfaces so that the chance of counterfeiting would be minimized.

Any suitable material may be used to manufacture the security seal inserts of this invention. Suitable materials are, for example, linear polyoxymethylene-acetal resin made by the polymerization of formaldahyde and having a high strength and being solvent resistant. These type of materials are moldable and have been used in aerosol containers. It is important that the security seal inserts used, and in particular, the cover member that is broken away, be made of material that is not easily repaired by an adhesive or glue. Once the screw is replaced, a new insert and cover member are welded together by any suitable type of system.

It is preferred that the welding be accomplished by the use of ultrasonic welding. In ultrasonic welding, the assembly method uses a controlled melting and reforming of a plastic cover to capture or lock another component or, in this case, the upwardly extending tabs in place. The plastic cover is in contact with an ultrasonic horn. High frequency vibrations of the ultrasonic horn are imparted on the top of the cover which melts to produce a bond with the tabs thus locking the cover in place. The progressive melting of plastic under the continuous but generally light pressure deforms the cover into tabs of this invention.

The advantages of ultrasonic welding include short cycle time (generally less than one second), tight assemblies with virtually no tendency for recovery, the ability to perform multiple welds with system. Other advantages are substantial control over the process, design simplicity and the elimination of consumables in the welding process. The integrity of an ultrasonically welded assembly depends upon the geometric relationship between the tab and cover, and the ultrasonic parameters used when forming the tab or melting it down.

Proper weld design produces optimum strength and appearance with minimum flash. There are several configurations of ultrasonic welding available; the principal of welding, however, is the same in each. The area of interference contact between the welding apparatus and the cover member should be kept within known geometry, thus concentrating the energy to produce a rapid melt.

In this invention, the ultrasonic welding of the cover member melts the cover member with the tabs and prevents access to the screw without first breaking the cover member that is melted thereon. A desirable type of material to use in the present invention is Delren, a trade name of the Dupont Company; Delren is of the class of materials commonly known as acetal resins.

DETAILED DESCRIPTION

Figure 1:
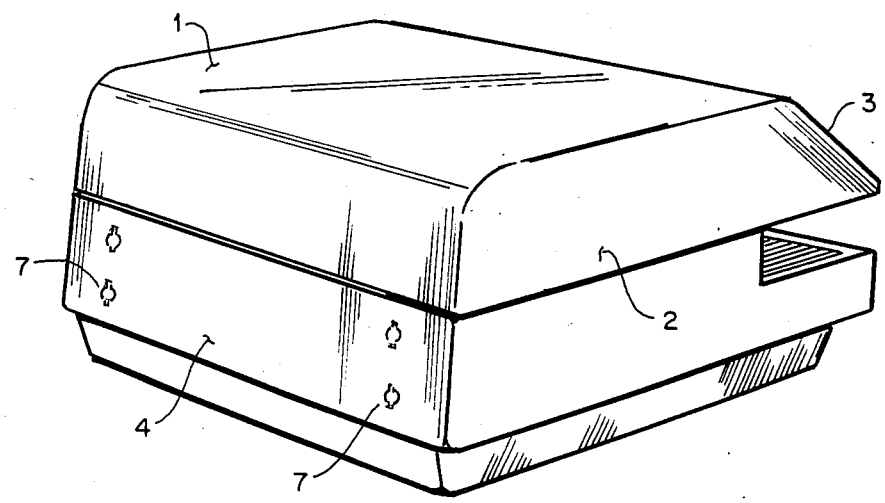
FIG. 1 is a perspective view of the sealed postage meter showing the location of the sealing unit in the back skirt or cover of the postage meter.

FIG. 1 illustrates a postage meter 1 which is equipped with a container housing or skirt 2 that encloses the mechanism for servicing the postage meter. The mechanics for setting the postage meter value or servicing the postage meter are all contained within the housing or skirt of the postage meter 1. The front 3 of the postage meter usually contains the external controls that operate the meter during use. The back of rear panel 4 of the postage meter contains the security device of this invention. However, it is preferred that the security device of this invention be placed at the bottom portion or panel of the postage meter so that it is not in view of the user. For purposes of clarity only, the drawing illustrates the security device as being located in the back portion of postage meter 1. Illustrated herein is the use of four separate security sealing means 7, each being positioned at the corners of the back panel.

Figure 2:
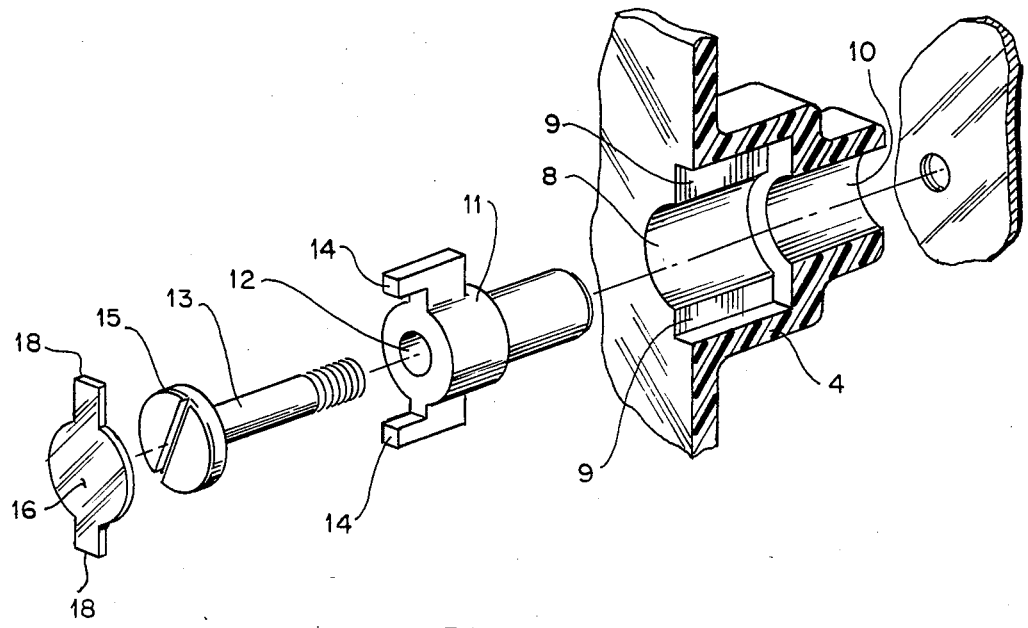
FIG. 2 is a perspective view of the security sealing insert and the cover with the cut out or apertured portion therein.

FIG. 2 illustrates the security seal insert 11 which is adapted to mate and fit snugly into aperture or cut out portion 8. Panel 4 has therein an aperture or cut out portion 8 having a circular configuration with two tab receiving openings 9 positioned diametrically across from each other. The center of the cut out portion 8 has a cover bore hole or seal receiving element 10 that runs completely through the thickness of postage meter cover 4. In the center of said insert 11 is a screw bore or tunnel 12 that will align with the screw receptacle. A screw 13 therefore can be inserted into the screw bore 12 and will extend through to connect the security seal insert 11 and meter cover 4 to the meter frame. Screw bore 12 is not threaded.

Extending above and outwardly from the top of security seal insert 11 are two tabs 14. These tabs will fit into the cover tab openings 9 and will mate therewith. Once the screw 13 has been inserted into the security seal insert 11 and connected to the postage meter frame, the screw 13 can be tightened and fixed into position. Thereafter a cover member 16 is placed over the security seal insert in mating engagement with the tabs 14. In this embodiment the keys 18 of cover member 16 are in contact with the tabs 14 of the insert 11. The cover member 16 via the keys 18 is then welded to the two tabs 14 preventing the removal of the screws 13 from the insert 11. After the welding operation has taken place, the cover member 16 is flush with the exterior of the postage meter frame. Once the cover member 16 has been welded to the tabs 14, the interior of the postage meter cannot be entered without first breaking the cover member 16. After the cover member 16 is broken, the screw 13 can be turned and loosened by a tool or screw driver and a new security seal insert 11 may be readily installed into the postage meter cover 4. It is apparent that it is impossible to remove the screw 13 without first drilling hole in the cover member 16 and thereafter breaking the member 16 off from tabs 14.

Figure 3:
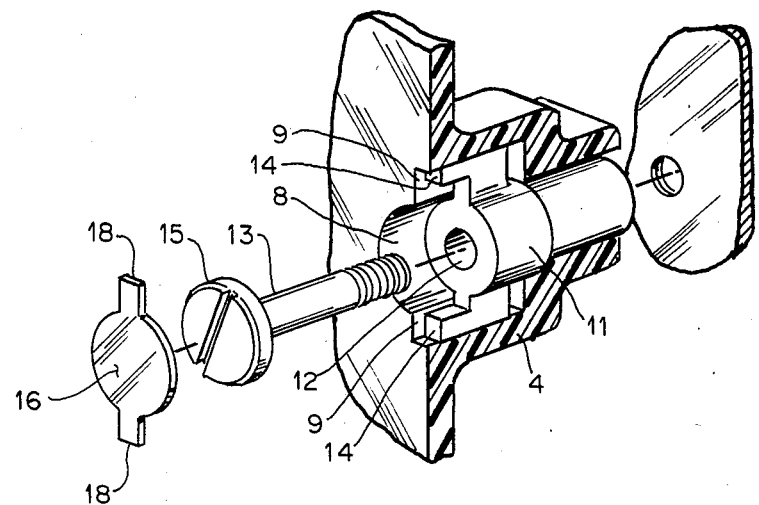
FIG. 3 is a cut away view of the security seal insert when it is put into position into the cover of the postage meter.
Figure 4:
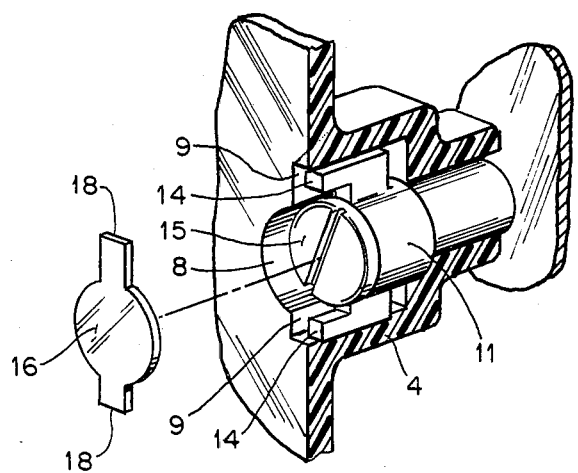
FIG. 4 is a cross sectional view of the security seal of this invention wherein the screw is inserted into the security seal insert.

In FIGS. 3 and 4, the security sealing means 7 is illustrated in break away relation to postage meter cover of panel 4. The security seal insert 11 is shown in position after insertion into the cut out portion 9 on the panel 4. Security seal insert 11 is shown with empty screw bore or tunnel 12 positioned therein. The security seal insert 11 is fixed into position in the cut out portion 8 and adapted to receive in bore 12 a screw 13. In FIG. 4, screw 13 is shown fixed in position through security insert seal 11 connecting said insert 11 to meter frame and trapping panel 4. Screw 13 after it has been inserted into screw bore 12 will extend through security insert to connect security insert 11 to frame. Shown extending above the top of the security seal insert 11 are tabs 14 which in FIG. 4 are shown just prior to being welded to the cover 16 also shown.

Figure 5:
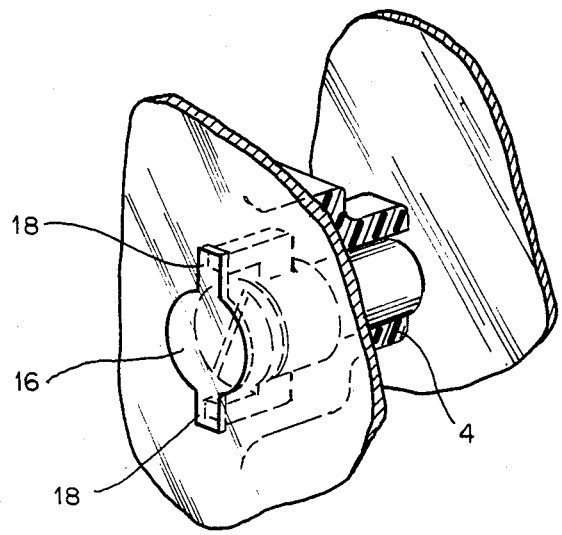
FIG. 5 is a cross sectional view of the security seal of this invention with the cover being placed over the tabs.
Figure 6:
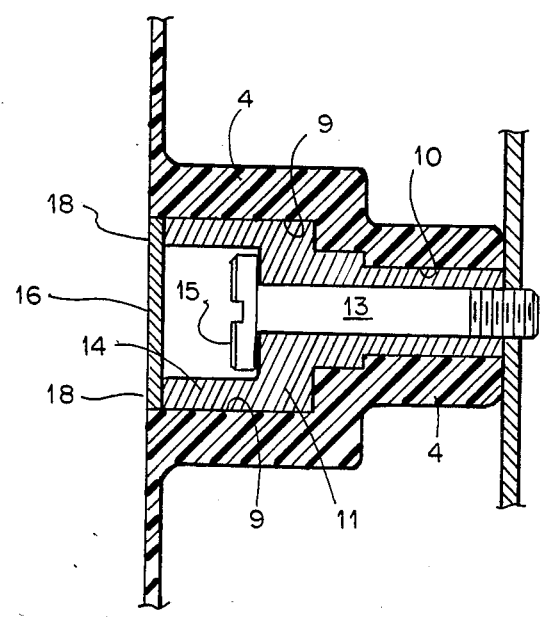
FIG. 6 is a cross sectional view of the security seal of this invention after the cover has been welded to the tabs.

FIGS. 5 and 6 show screw 13 inserted into security seal insert 11 and connecting the insert 11 to frame of the postage meter. The cover member 16 in FIG. 6 has been ultrasonically welded to tabs 4 over the head 15 of screw 13 therefore locking screw 13 into security seal insert 11. As is seen, the keys 18 of cover member 16 have been welded to tabs 14 of the insert 11. As is also seen, the cover member 16 is flush with the exterior surface of the postage meter frame. Once the cover member 16 has been welded over tabs 14, the removal of screw 13 is impossible without first drilling a hole in the cover member 16 and breaking off cover member 16 from the top of screw heads 15.

The cover member 16 may be pried off by any suitable means such as a screw driver or other appropriate tool. Once the cover member 16 has been broken, screw 13 can be turned and loosened by any suitable device. Screw 13 is then loosened up, removed from the security seal insert 11 and the panel 4 removed from the back portion or the preferred position at the bottom portion of postage meter 10.

Once panel 4 has been removed, servicing of the interior of postage meter 1 can take place. To reuse, the broken insert 11 is removed and new inserts are pressed into seal receiving element 10. A screw is then inserted into the screw bore hole 12, tightened, a new cover member 16 is attached to tabs 14 of insert 11 and the welding of the cover member 16 to the tabs 14 again takes place to secure the screw 13 into position.

This security seal of this invention provides for easy manufacturability in that a tool can be utilized that is of a simple geometric configuration. Hence, since the cover member 16 is flush with the surface of the meter, the tool to perform the ultrasonic welding operation can have a flat surface. The tooling would also be relatively inexpensive due to its simple geometry. Finally, an unskilled operator could operate the tooling to perform the operation due to the tooling simplicity.

The above-described embodiment can be modified in a variety of ways and those modifications would still be within the spirit and scope of Applicants' invention. Thus, while this invention has been disclosed by means of a specific illustrative embodiment, the principles thereof are capable of a wide range of modification by those skilled in the art within the scope of the following claims.

What is claimed is:

1. A security sealing means for locking the housing of a postage meter to a postage member frame comprising in combination a housing panel having an aperture therein,
    an insert fitting into and mating with said aperture in the housing panel, said insert having a bore therein receiving a screw engaging said postage meter frame, said insert having upwardly extending tabs, said tabs extending beyond the head of the screw received in said bore, a cover member attached to said tabs by welding thereto, said cover member being of a shape so as to cover said aperture when welded to said tabs, and said cover member thereby being operative when welded to said tabs to prevent access to the screw received in the bore.

2. The sealing means of claim 1 wherein said tabs are located at diametrically opposite portions of said insert.

3. The sealing means of claim 1 wherein said cover member and the tabs are constructed of a substantially breakable material not readily repaired by an adhesive.

4. The sealing means of claim 1 wherein said insert has a circular configuration with said tabs located on its outer periphery, said tabs extending upwardly and away from said circular portion.

5. The sealing means of claim 1 wherein said screw is a break-off screw.

6. The sealing means of claim 1 wherein said cover member and the tabs are constructed of a material that can readily be welded by ultrasonic means.

7. The sealing means of claim 1 wherein said insert is removably fitted into the aperture of said housing panel and temporarily affixed thereto by a break-off screw.

8. The sealing means of claim 1 wherein said cover member and tabs are constructed of a linear polyoxyalkylene-acetal resin.

9. A postage meter security sealing means for sealing a postage meter housing to a postage meter frame, comprising the postage meter housing having an opening that extends through the thickness of said housing, a security seal insert received in and mating with said opening in said housing, said insert being of circular configuration and having two tabs extending upwardly and away from the main portion of said insert, said insert having a screw bore hole positioned centrally therein, a screw received in the bore hole of said insert and engaged with said postage meter frame, and a cover member welded to the tabs for covering the screw bore hole to prevent access to the screw after the screw is attached.

10. The sealing means of claim 9 wherein said housing opening is slightly larger than and of the same geometrical configuration as said insert.

11. The sealing means of claim 9 wherein said tabs are located at diametrically opposite portions of said insert.

12. The sealing means of claim 9 wherein said cover member and tabs are constructed of a substantially frangible material that cannot be readily repaired once broken.

13. The sealing means of claim 9 wherein said insert has a circular configuration having said tabs located on its outer periphery, said tabs extending upwardly away from said circular portion.

14. The sealing means of claim 9 wherein screw is a breakoff screw.

15. The sealing means of claim 9 wherein said tabs and the cover member are constructed of material that is adapted to be welded by ultrasonic means.

16. The sealing means of claim 9 wherein said breakable tabs and cover member are constructed of a linear polyoxyalkylene-type acetal resin.

17. The sealing means of claim 9 wherein said insert is removably fitted into said panel and temporarily affixed thereto by a break-off screw.

* * * * *